United States Patent [19]

Inoue

[11] 4,133,327

[45] Jan. 9, 1979

[54] FUEL VAPORIZING HEAT EXCHANGER FOR AN INTERNAL COMBUSTION ENGINE

[75] Inventor: Mitsumasa Inoue, Yokohama, Japan

[73] Assignee: Nissan Motor Company, Ltd., Japan

[21] Appl. No.: 806,514

[22] Filed: Jun. 14, 1977

[30] Foreign Application Priority Data

Jun. 18, 1976 [JP] Japan .............................. 51/79835[U]

[51] Int. Cl.² ............................................. F02M 31/02
[52] U.S. Cl. ............................... 123/122 AC; 165/105; 261/144; 261/145; 123/122 A; 123/122 AA
[58] Field of Search ................. 123/122 AB, 122 AC, 123/122 H, 122 A, 122 AA; 165/105, 52; 261/144, 145

[56] References Cited

U.S. PATENT DOCUMENTS

| | | | |
|---|---|---|---|
| 1,100,894 | 6/1914 | Layne | 123/122 AA |
| 1,222,548 | 4/1917 | Lamar | 123/122 AA |
| 3,963,010 | 6/1976 | Harned | 123/122 AC |
| 3,963,012 | 6/1976 | Harned | 123/122 AC |
| 3,965,681 | 6/1976 | Wyczalek | 123/122 AB |
| 3,970,062 | 7/1976 | Nakada | 123/122 AC |
| 3,977,378 | 8/1976 | Harned | 123/122 AC |
| 4,022,172 | 5/1977 | Fingeroot | 123/122 AB |

Primary Examiner—Ronald H. Lazarus

[57] ABSTRACT

Heat is rapidly conducted to the induction manifold from the exhaust manifold via heat pipes, the heat absorbing ends of which have exhaust gases controllably directed thereagainst by a bimetallic operated butterfly valve and the heat emitting ends of which can be formed with, fins hollow or solid to increase the surface area thereof which contactingly and radiatingly heats all of the air fuel mixture passing through the induction manifold.

9 Claims, 4 Drawing Figures

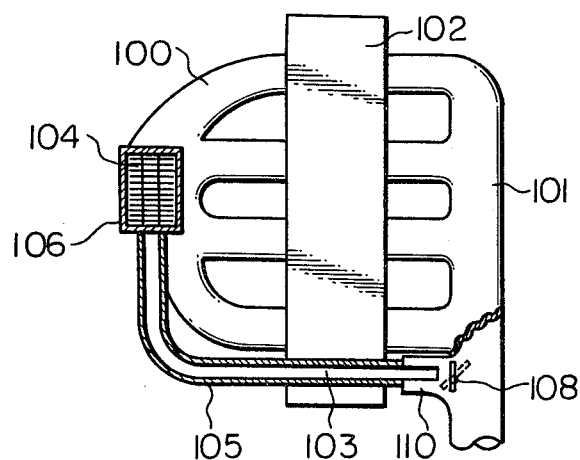
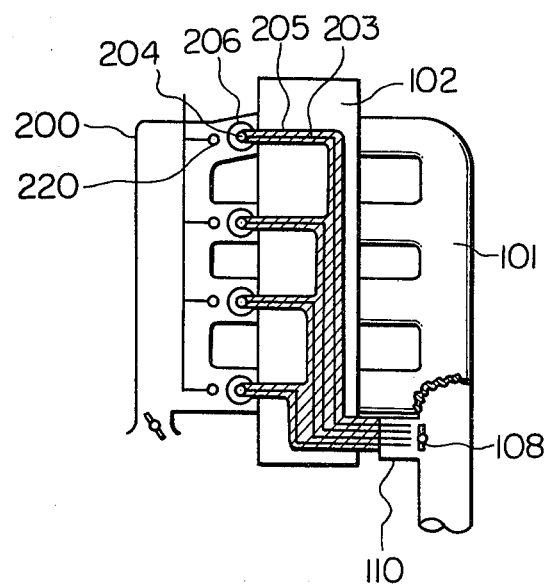

FUEL VAPORIZING HEAT EXCHANGER FOR AN INTERNAL COMBUSTION ENGINE

BACKGROUND OF THE INVENTION

1. FIELD OF THE INVENTION

This invention relates to an internal combustion engine and more particularly to a fuel vapourizing heat exchanger for same which employs "heat pipes" to transfer thermal energy contained in the exhaust gases to the air-fuel mixture prepared in the carburetor of the engine to ensure complete vapourisation of the liquid hydrocarbon fuel.

It is well known to provide a heat exchanger in the induction passage or manifold of an internal combustion engine immediately downstream of the carburetor or injectors mounted thereon to promote the vaporuisation of unvapourised liquid fuel and fuel droplets suspended in the air passing therethrough.

2. DESCRIPTION OF THE PRIOR ART

A number of devices have been proposed to achieve the above mentioned vapourisation. These include water jacketing a part of the carburetor and the whole of the induction manifold, exhaust jacketing the induction manifold combined with localised or "hot spot" heating methods.

The first i.e. water jacketing while quite effective once the engine is warmed up, requires an undesirably long time to reach an effective working temperature and can be used only in water cooled engines. Rather complex casting and water sealing gaskets are also required with such a manifold.

The second which is widely used at this time is effective in that it features rather a short warm up period but as in the case of the water jacketed manifold requires complex casting operations to produce same and gas tight sealing gaskets to prevent dangerous leakage of CO and other noxious gases in the vicinity of the engine proper. Furthermore unless finning or other heat transferring means is provided the latter method can only heat a small surface area which limits the effectiveness thereof, and should the temperature of the aforementioned surface area rise unduly, the air fuel mixture is overheated to raise the temperature thereof to a point where the density of said air fuel mixture is reduced accordingly causing a loss in charging efficiency. Hence rather accurate control of the temperature is required and/or limiting the thermal capacity of the heating surface so that the incoming charge absorbs all the available heat leaving none or sudden high demand periods such as transition periods from one mode of operation to another. The latter mentioned problem being one which also plagues the afore mentioned systems.

A major drawback of the exhaust jacketed system is the great difficulty experienced in fitting same to an internal combustion engine equipped with a cross flow head wherein the induction manifold and the exhaust manifold are on opposite sides of the engine. This problem can be overcome by using the water jacketed system, however as described earlier this method is not greatly fovoured.

Thus there still remains a need for a heat exchanger which can be fitted easily to both cross flow and non cross flow type cylinder head equipped engines, which is simple in construction heats rapidly, has a large air-fuel contacting surface, is light and does not heat the air fuel mixture to a degree to where the charging efficiency of the engine is impaired.

SUMMARY OF THE INVENTION

According to this invention a fuel vapourising heat exchanger which satisfies the above listed requirements has been developed which uses the so called "heat pipe" type conductor, a byproduct of space research, to rapidly conduct heat from the exhaust manifold to the induction manifold.

As is well known a "heat pipe" is basically a hollow tube like member containing a wick and a vapourisable working substance. The working substance is heated and vapourised at one end so that the vapour thus produced passes to the other end of the tube where it condenses to release the heat of vapourisation. On condensing the substance is absorbed by the wick and returned to the first end for reheating. The working substance contained in the heat pipe (usually a liquid) may vary from freon or the like (refrigerants propane etc) to sodium metal or the like. The outstanding feature of a heat pipe is the speed at which heat is conducted from one end to the other. This speed cannot in fact be matched by extremely good heat conductors such as copper and the like.

In detail the invention is characterized by a single heat pipe in the case of a cross flow type cylinder head and a plurality of same in the case of a non cross flow head, wherein the heat absorbing end or ends are exposed to the flow of hot exhaust gases in the exhaust manifold and the heat emitting end or ends are disposed in the induction manifold riser so as to heat without fail all of the air fuel mixture passing therethrough. A suitable flow control valve is arranged to variably direct the bulk of the exhaust gases either against the ends of the heat pipes or through the exhaust manifold so as to bypass said ends to maintain a substantially constant heat emitting end temperature. Where only one heat pipe is used suitable finning is provided on the heat emitting end to increase the surface area of same. These fins can be either thin solid metal or hollow to fluidly communicate with the interior of the heat pipe. The disposure in a single conduit of a plurality of heat pipes makes the finning unnecessary due to the inhereintly large surface area thereof. In the case of fuel injection a plurality of heat pipes are arranged so that the respective heat emitting ends thereof are located in individual branch passages downstream of the injectors. The ends being preferably provided with the before mentioned finning.

Thus it is an object of the present invention to provide a fuel vapourising heat exchanger for an internal combustion engine which very rapidly reaches a working temperature to heat the air fuel mixture passing through the induction manifold promoting intimate mixing of the liquid hydrocarbon fuel with the air.

It is another object of the present invention to provide a fuel vapourising heat exchanger for an internal combustion engine which may be used in engines where the exhaust manifold is separated from the induction manifold by a relatively large distance, as in the case of a cross flow type cylinder head, as well as in engines where the manifolds are closely arranged.

It is still another object of the present invention to provide a fuel vapourising heat exchanger for an internal combustion engine which uses so called "heat pipe" conductors to transfer the heat contained in the exhaust gases to the air fuel mixture passing through the induction manifold.

It is yet another object of the present invention to provide a fuel vapourising heat exchanger for an internal combustion engine wherein the heat transferred to the air fuel mixture is controlled by a simple valve disposed in the exhaust manifold which is both operable in response to the temperature of the exhaust gases and/or sudden changes in the operation mode of the engine to direct varying amounts of exhaust gases against the heat absorbing end or ends of the heat pipe or pipes.

Yet another object of the invention is to provide a fuel vapourising heat exchanger for an internal combustion engine which uses heat pipes to rapidly conduct heat to the air fuel mixture passing through the induction manifold and is therefore light, and easily installed.

BRIEF DESCRIPTION OF THE DRAWINGS

Other features, objects and advantages of the present invention will become more apparent as the description proceeds taken in conjunction with the accompanying drawings in which:

FIG. 3 is a schematic plan view of an internal combustion engine equipped with a cross flow type cylinder head showing (in section) a fuel vapourising heat exchanger according to a second embodiment of the present invention; and FIG. 4 is a schematic plan view of an internal combustion engine equipped with a cross flow type cylinder head and fuel injection showing a third preferred embodiment of the present invention.

DESCRIPTION OF THE PREFERRED EMBODIMENTS

Figure 1:
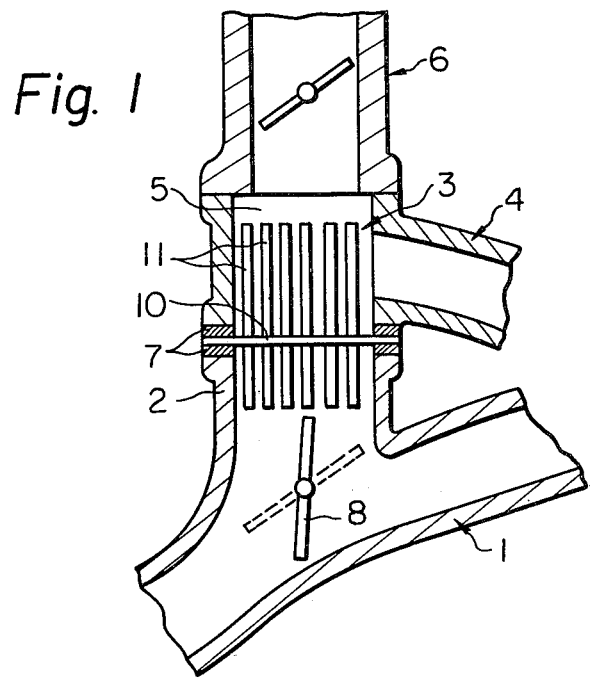
FIG. 1 is a sectional view of portions of the induction and exhaust manifolds of an internal combustion engine showing the first preferred embodiment of the present invention operatively disposed therein.
Figure 2:
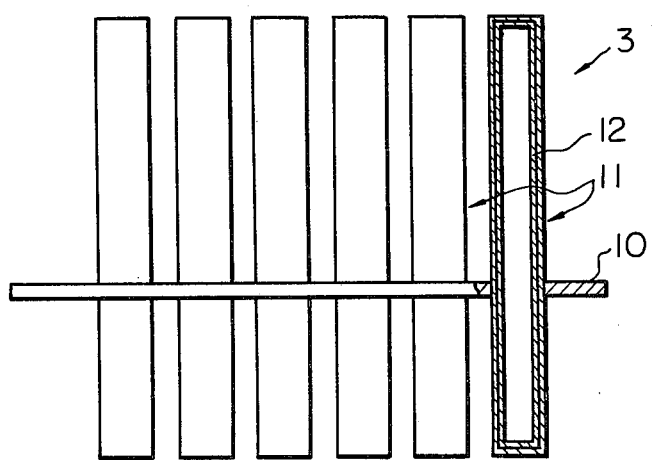
FIG. 2 is a partially sectioned view showing only the fuel vapourizing heat exchanger according to the first embodiment of the invention.

Let us now turn our attention to FIGS. 1 and 2 wherein the first preferred embodiment of the invention is shown. The numeral 1 denotes an exhaust manifold which fluidly communicates with a combustion chamber of an internal combustion engine connected to an internal combustion engine (neither shown). The numeral 2 denotes a chamber formed in the exhaust manifold which will be referred to as the exhaust manifold riser in the following description. As shown the exhaust manifold riser 2 is arranged to have exhaust gases either directed into it from the exhaust manifold or almost prevented from entering it by the provision of a exhaust gas flow control valve 8. The exhaust gas flow control valve 8 has a heat sensitive control means attached operatively to the shaft thereof so that during cold conditions (e.g. cold starting of the engine) the bulk of the exhaust gases are directed into the exhaust manifold riser, and during warmed up operation of the engine the bulk of the exhaust gases are directed past same. Since the operation and construction of such devices are very well known in the art no further description will be given for brevity. It will be noted however that the exhaust gas control valve can be operatively connected to the throttle valve of the carburetor so that during transient periods the valve 8 will be either opened or closed to increase the amount of available heat or reduce same as well as the temperature sensitive bimetal control means (or the like).

A induction manifold riser 5 is, as shown arranged to matingly fit atop the exhaust manifold riser 2 and be sealingly divided therefrom by a plate member 10 which will be referred to as the base plate 10 hereinafter. A pair of gaskets 7 are arranged on either side of the base plate to provide a gas light seal the connected ends of the two riser portions. Mounted atop of the induction manifold riser 5 is a downdraft type carburetor 6 (only partially shown) which has a throttle valve rotatably disposed therein. Fluidly communicating with the carburetor is a branch passage 4 (only one is shown for simplicity) formed so as to open through an inlet orifice into the interior of the induction manifold riser 5 in which inturn provides fluid communication with the before mentioned combustion chamber.

Now disposed through the base plate 10 a plurality of heat pipes 11. As seen best in FIG. 1 the first ends of the heat pipes 11 are arranged to extend through the base plate 10 to be exposed to the flow of the exhaust gases passing through the exhaust manifold 1. The second or other ends of the heat pipes are arranged to extend through the base plate and substantially through the entire length of the induction manifold riser. This arrangement ensures that the air fuel mixture flowing from the carburetor passes over and around the heat pipes to receive heat therefrom and none of said mixture enters the branch passage 4 without being heated. As will be obvious to one skilled in the art heat is transmitted to the air-fuel mixture not only by direct contact with the heat pipes but by heat radiated therefrom. Thus with the construction shown in FIGS. 1 and 2 the spaces between the pipes will be filled with heat radiation thereby leaving no unheated space with in the chamber defined by the induction manifold riser 5. Furthermore any unvapourised fuel running down the walls of the carburetor barrel and into the induction manifold riser will be collected in the well (no numeral) defined at the bottom of the riser between the base plate and the inlet orifice of the branch passage formed in the side wall thereof. Subsequently this fuel will be vapourised and fed into the combustion chambers via the branch passage or passages in the case of a multi cylinder engine.

Let us now look at FIG. 2 wherein the combination of the base plate and the heat pipe generally denoted by the numeral 3 in FIGS. 1 and 2 is shown in more detail. As can be seen the pipes are inserted through holes formed in the base plate 10 and welded or suitably caulked. Although not shown in the drawings, the base plate has a circular shape (or the like) and the heat pipes are arranged to protrude through the plate at substantially equal distances from each other (somewhat like the bristles on a tooth brush if the heat of same were round.)

The detailed construction of the heat pipes themselves is best seen in FIG. 2 wherein one of the pipes is shown in cross section. Disposed along the inner surface of the pipe is a wick 12 made of a suitable material which functions to return the condensed working fluid to the heat absorbing end of the pipe. Since the operation of heat pipes is well known in the art no further description will be given.

In operation when the engine is first started and is still in a cold condition the exhaust flow control valve is arranged to take the position shown in solid lines in FIG. 1 whereupon the exhaust gases flow up into the exhaust manifold riser to contact the lower heat receiving ends of the heat pipes 11. Since the heat is conducted very rapidly by the pipes, the very rich charge entering the induction manifold riser from the carburetor is almost immediately heated. A rapid feedback-like phenomenon thus starts to take place. As the heat is conducted from the exhaust gases and transferred to the air fuel mixture in the induction manifold riser 5 the very rich mixture is heated to vapourise the liquid hydrocarbon fuel thereby increasing the intimacy with which the air and the fuel is mixed. More efficient combustion then starts to take place in the combustion chambers of the engine to produce higher temperature exhaust gases. This increase in thermal energy of the gases is quickly transferred to the incoming charge (air fuel mixture) to even further heat the same. Simultaneously the liquid and unvapourized hydrocarbon fuel collected in the above mentioned well formed at the bottom of the induction manifold riser is vapourized to add the combustible matter entering the combustion chambers.

Normally the engine slowly warms up and during this period the choke remains closed or only partially open to feed an excessive amount of fuel to the engine. A quantity of this fuel usually goes completely unused and is discharged from the exhaust pipe of the vehicle in the form of unburned vapourized fuel, and on cold days in liquid form, adding to the already notable air pollution problem. the reason for this is the slowness with which the prior art heating devices reach effective temperatures. With the present invention however warming of the heat pipe heat exchanger is very rapid therefore reducing the period for which the choke must be used to minutes. In short the present invention quickly produces a mixture wherein the droplets of fuel are finely dispersed and/or vapourized compared with the prior art which after the same period of time is still producing a mixture wherein the droplets of fuel are relatively large and thus poorly dispersed. The finely dispersed mixture is of course easily and efficiently combustible as compared with a poorly dispersed mixture.

When the rapid increase in the temperature of the heat exchanger approaches and/or reaches a suitable working temperature the bimetallic sensor (or the like) partially closes the opening of exhaust manifold riser by rotating the exhaust gas flow control valve 8 forward the position shown in FIG. 1 in broken lines. Still an amount of exhaust gases are permitted to enter the riser to maintain the above mentioned suitable working temperature, which according to this invention is approximately 150° C. Thus over heating of the air fuel mixture is prevented whereby loss of charging efficiency due to reduced charge (air-fuel mixture) density is accordingly prevented. As previously mentioned the exhaust gas flow control valve may be opened temporarily during sudden changes from say a cruising mode to a high speed mode of operation (i.e. a transition period) to maintain the desired working temperature of the heat pipes despite a greatly increased amount of heat absorbing air and liquid hydrocarbon fuel being passed thereover.

FIG. 3 shows a second preferred embodiment of the invention wherein a single heat pipe 103 is used. The numeral 100 denotes an induction manifold, 101 an exhaust manifold 102 a cross flow type cylinder head, and 104 the riser of the induction manifold. Operatively disposed between the induction manifold 100 and the exhaust manifold 101 is a single heat pipe 103. This pipe is larger in diameter than those of the first embodiment to increase the thermal capacity thereof, is covered with a heat insulating cover 105 and as shown is passed through the cylinder head 102 via a passage (no numeral) formed therethrough. If desired this passage may be omitted and the heat pipe passed over the cylinder head or around the block of the engine. The heat absorbing end of the heat pipe 103 is exposed to the exhaust gases present in a chamber 110 or suitable means formed in or on the exhaust manifold or exhaust conduit following same. Disposed in the entrance of the chamber 110 is a exhaust gas flow control valve 108 which is functionally identical to that shown and described in the first embodiment of the present invention. In this Figure the valve 108 is shown in a closed position in solid line and in an open position on broken lines. Similar to the first embodiment in the open condition the exhaust gases are directed not into the exhaust gas manifold riser but into the chamber 110 and in the closed position substantially directed past same. In place of the plurality of heat pipes of the first embodiment the single heat pipe 103 of this embodiment is formed with a single heat emitting end having a plurality of this heat conducting metal fins 106 and/or a plurality of fins the interiors of which are fluidly communicated with the interior of the heat pipe 103 whereby the working fluid is permitted to heat exchangingly pass therethrough. Further as can be seen the fins 106 are arranged to extend almost to the walls and upper and lower surfaces of the induction manifold riser 104 thereby providing a rather vast surface area for heating the air-fuel mixture both by contact and by radiation.

In operation the second embodiment of the invention is exactly the same as the first. The distance travelled within the heat pipe is considerably longer than that in the first embodiment however the remarkable speed at which the heat pipes transfer the heat from one point to another is sufficient to heat the heat emitting portion of the heat pipe very shortly after the hot exhaust gases contact the heat absorbing end of the same. Thus no problem with delayed heating of the air fuel mixture is experienced. Of course the shorter the heat pipe the quicker the heat transfer however the length of same in this embodiment must be tempered with considerations of removing the cylinder head from the engine block and or providing easy accessability to other engine parts and components.

FIG. 4 shows a third embodiment of the present invention. In this case a plurality of fuel injectors 220 are operatively disposed in respective branch passages of the induction manifold 200. As in the previous embodiment an exhaust manifold 101 is mounted on the cross flow type cylinder head 102 to receive the exhaust gases therefrom. A chamber 110 is arranged as before with an exhaust gas flow control valve 108 operatively disposed in the entrance thereof. However a plurality of heat pipes 203 are arranged to have their heat absorbing ends exposed to the interior of the chamber. As seen each of the heat pipes 203 have heat emitting finned end portions equipped with fins 206 and are disposed downstream of the injectors 220. Surrounding the heat pipes is an insulating cover 205, however the form of the heat pipes and the insulating cover is merely by way of example and any other suitable arrangement is possible.

In operation once the engine is started and heat is rapidly conducted via the heat pipes to the induction manifold, heat is transferred to the air fuel mixture which is created just upstream of the heat emitting end of each heat pipe. As before all of the fuel injected is quickly vapourised due to contact with and by heat radiation from the heat emitting end of the heat pipe. Hence very shortly after starting engine an efficiency combustible air fuel mixture is fed to the combustion chambers reducing greatly the amount of fuel passing through the motor without partaking in the actual combustion. Thus it is possible to cease choking the engine at a very early time and/or eliminate same completely.

The above described embodiments, as will be obvious to one skilled in the art, feature a number of a advantages, for example, the air fuel mixture is rapidly heated Ω vapourized and intimately mixed to achieve smooth economical engine operation a very short time after starting, thus reducing the amount of unburned fuel discharged into the atmosphere (i.e. HC) emission is reduced) and subsequent to warming the engine, the engine is operable on a mixture relatively leaner than possible with the prior art due to the excellent heating and vapourizing properties of the heat pipe type heat exchanger. The heat pipes enable without any design problem a vast heating and radiating surface areas to be used and enable the very rapid transfer of heat from an exhaust manifold located at some distance from the induction manifold. Since the heat pipes are hollow and not large in diameter they are both light and easy to install with standard well known components.

Of course, in the case of the first embodiment steps must be taken to ensure that the heat pipes projecting into the induction manifold riser do not cause any flow restriction and reduce the volumetric efficiency of the induction manifold. Similar steps must be taken in the second and third embodiments also.

It will be also appreciated that the invention is not limited to reciprocating internal combustion engines and may be applied to any internal combustion engine including the rotary variety.

What is claimed is:

1. A fuel vapourizing heat exchanger in combination with an internal combustion engine, said engine having
   an induction manifold fluidly connected to a combustion chamber,
   an air-fuel mixture forming means operatively disposed with said induction manifold, said air-fuel mixture forming means being arranged to supply an air-fuel mixture through the inducton manifold to said combustion chamber for combustion therein, said induction manifold being formed with a riser and at least one branch passage, said at least one branch passage providing fluid communication between said riser and said combustion chamber; and
   an exhaust manifold operatively connected to the engine to receive the hot exhaust gases therefrom;
   said heat exchanger comprising:
   heat pipe heat conducting means including a plurality of heat pipes each of which has:
   a first end disposed in said exhaust manifold to absorb heat from the hot exhaust gases, and
   a second end disposed in said induction manifold to emit heat to the air-fuel mixture, said second end of each heat pipe extending through substantially the entire length of the induction manifold riser so as to cross the inlet orifice of said at least one branch passage, so that all of the air-fuel mixture entering said at least one branch passage is heated by contact with and by heat radiation from said heat pipes; and
   exhaust gas flow control means operatively disposed in the exhaust manifold to direct a variable volume of exhaust gases against said first heat absorbing end of said heat pipes so as to maintain a substantially constant predetermined temperature at said heat emitting end of the heat pipe conducting means.

2. A fuel vapourizing heat exchanger as claimed in claim 1 wherein said second ends of said heat pipes are formed with fin means which increase the surface area of said second ends.

3. A fuel vapourizing heat exchanger as claimed in claim 1 wherein said heat pipe heat conducting means further includes;
   a base plate disposed between said induction manifold and said exhaust manifold forming a bottom end wall of said riser, said plurality of heat pipes being disposed through said base plate.

4. A fuel vapourizing heat exchanger as claimed in claim 1 wherein said plurality of heat pipes are each made so that said second ends are each arranged in a branch passage of said induction manifold between said air-fuel forming means and said combustion chamber, said heat emitting ends having fin means formed thereon.

5. A fuel vapourizing heat exchanger as claimed in claim 1 wherein said air-fuel forming means is a carburetor mounted immediately upstream of the induction manifold riser in which said plurality of heat pipes are arranged.

6. A fuel vapourizing heat exchanger as claimed in claim 1 wherein said exhaust control means comprises:
   chamber means formed in the exhaust manifold into which said first ends of said heat pipes project; and
   valve means arranged in the exhaust manifold to direct a variable volume of exhaust gases into said chamber means, said valve means being operatively connected to control means which is heat sensitive to open said valve means when the engine is in a cold condition and when a large amount of heat is required to be transferred to said second ends of said heat pipes and close the valve means the engine is in a warmed up condition to direct the bulk of the exhaust gases to by-pass the chamber means.

7. A fuel vapourizing heat exchanger as claimed in claim 1 wherein said predetermined temperature is 150° C.

8. A fuel vapourizing heat exchanger as claimed in claim 2 wherein said fin means comprises a plurality of thin solid fins formed of a good heat conducting metal.

9. A manifold system for an internal combustion engine comprising:
   a carburetor;
   an induction manifold including a riser which has an inlet port communicating with said carburetor to receive an air-fuel mixture therefrom, said induction manifold also including a plurality of branch passageways leading from said riser toward the internal combustion engine, each of said branch passageways having an inlet orifice opening into the interior of said riser;
   an exhaust manifold;
   said induction manifold and said exhaust manifold having a common opening arranged directly below said inlet port of said riser;
   a plate made of heat conductive material, dsaid plate being interposed between said induction manifold and said exhaust manifold to close said common opening to define the bottom wall of said riser;

a plurality of heat pipes, each of said heat pipes having substantially the same cross section along the entire length thereof and having a heat absorbing portion and a heat emitting portion, each heat absorbing portion of said plurality of heat pipes being disposed in said exhaust manifold so as to be exposable to the hot exhaust gases flowing therein, and each heat emitting portion of said plurality of heat pipes being disposed in said induction manifold so as to extend through said riser in a parallel spaced relation and cross each inlet orifice of said plurality of branch passageways so as to define a heating zone whereby all of the air-fuel mixture flowing from said carburetor will pass through said heating zone to be heated by contact with and heat radiation from said plurality of heat pipes before entering said plurality of passageways, said heat pipes being arranged to conduct heat from said heat absorbing portion to said heat emitting portion; and thermostatically controlled valve means disposed in said exhaust manifold for selectively directing a portion of the exhaust gases against said heat absorbing portions of said heat pipes and said plate.

* * * * *